United States Patent [19]

Westfall

[11] Patent Number: 5,073,784
[45] Date of Patent: Dec. 17, 1991

[54] TRANSMITTER LOCATION SYSTEM FOR FREQUENCIES BELOW HF

[75] Inventor: Wallace D. Westfall, San Diego, Calif.

[73] Assignee: The United States of America as represented by the Secretary of the Navy, Washington

[21] Appl. No.: 249,443

[22] Filed: Apr. 26, 1972

[51] Int. Cl.[5] ............................................. G01S 3/02
[52] U.S. Cl. ..................................... 342/465; 342/147; 342/444; 342/450
[58] Field of Search ........................ 343/112 R, 113 R; 342/147, 444, 450, 465

[56] References Cited
U.S. PATENT DOCUMENTS 2,976,530 3/1961 Werner et al. .......... 343/113 R UX
3,118,141 1/1964 Bailey .............................. 343/113 R Primary Examiner—Linda J. Wallace
Attorney, Agent, or Firm—Harvey Fendelman; Thomas Glenn Keough; J. W. McLaren

[57] ABSTRACT

Differential phase measurement techniques and apparatus for accurately locating unknown transmitters over great distances at radio frequencies below HF. A network of separated, time- and phase-synchronized, pairs of receiving stations having vertical whip antennas and having a known base-line geometry with respect to each other are used to accurately measure VLF phase differentials. The measured phase differences are compared against theoretical calculated values to provide highly accurate transmitter location information.

2 Claims, 2 Drawing Sheets

TRANSMITTER LOCATION SYSTEM FOR FREQUENCIES BELOW HF

BACKGROUND OF THE INVENTION

At VLF and LF, transmitted radio signals consist of many vertically polarized earth-ionosphere waveguide modes which, in general, possess different attenuation rates and different phase velocities. For each different frequency, a signal is represented by the phasor sum of the modes. An incremental phase velocity $V_i(\overline{D})$ which $V_1$ varies directly as a function of distance D is defined as follows:

$$V_i(\overline{D}) = \frac{dD}{dt} \approx \frac{\Delta D}{\Delta t}(\overline{D}) \quad (1)$$

In equation (1), $\Delta D$ is defined as the incremental change in distance, and $\Delta t$ is the incremental change in phase (in seconds, for example) which occurs over the distance increment at a mean distance $\overline{D}$ from the transmitter.

Total phase change over a great-circle path of distance D can be expressed by the following equation wherein t is expressed in microseconds:

$$t = 10^6 \int_0^D \frac{dD}{V_i(D)} \approx 10^6 \sum^D \frac{\Delta D}{V_i(D)} \cdot \frac{1}{K} \quad (2)$$

where K is equal to the total number of incremental values in the distance D.

The summation term in equation (2) provides an average phase velocity $\overline{V}$ for any great-circle path whose distance is equal to D:

$$\overline{V}(D,t) = \frac{D}{t} \cdot 10^6 \quad (3)$$

where t is again expressed in microseconds.

Experimental work by the inventor has demonstrated that incremental phase velocity $V_i(\overline{D},t)$ and average phase velocity change, $\overline{V}(D,t_1) - \overline{V}(D,t_2)$ are measurable quantities at VLF and that they can be accurately calculated when certain ionospheric models are assumed. Likewise, it was determined that vertical whip antennas are more effective for HF direction finding applications than loop antennas since vertical whips respond to the vertical field only, whereas loop antennas respond to abnormal field components which cause direction finding errors.

OBJECTS OF THE INVENTION

It is the primary object of the present invention to provide a transmitter location system for improving direction finding accuracy over great distances at radio frequencies below HF by means of measurements of incremental phase velocity $V_i(\overline{D})$, average phase velocity change and also amplitude.

It is another object of the present invention to provide a transmitter location system utilizing vertical whip antennas to minimize unpredictable direction finding errors.

It is a further object of the present invention to provide apparatus, including vertical whip antennas, for measuring phase differentials in a network of time- and phase-synchronized receiving stations.

It is a yet further object of the present invention to provide techniques and apparatus for continuously monitoring ionospheric conditions by measuring amplitude and incremental phase velocity of transmissions from transmitters whose locations are known, whereby unpredictable, day-to-day and seasonal changes in propagation medium can be identified to eliminate direction finding errors created by these changes.

Other objects, advantages and novel features of the invention will become apparent from the following detailed description of the invention when considered in conjunction with the accompanying drawings.

DESCRIPTION OF THE PREFERRED EMBODIMENT

Figure 1:
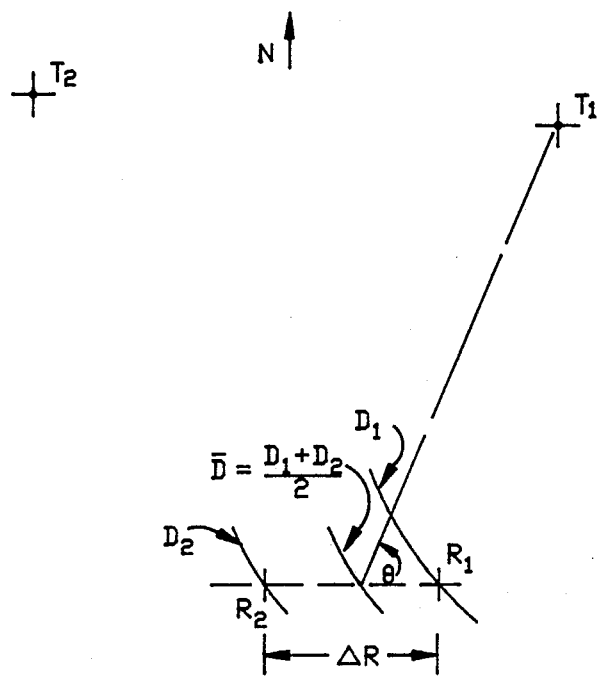
FIG. 1 is a simplified drawing of the geometry of a network of time- and phase-synchronized VLF receiving stations and a transmitter station which will be used to illustrate the inventive concept of measuring incremental phase velocity from a differential phase measurement.

FIG. 1 illustrates the geometry of a two-receiver time- and phase-synchronized station system relative to a VLF transmitter $T_1$ whose location is to be determined. It should be appreciated that only two receiver stations are shown to simplify the following description, and that in practice, three or more stations are employed.

The transmitter $T_1$ operates at a frequency f and is located at distances $D_1$ and $D_2$ from the two receiver stations, $R_1$ and $R_2$, respectively. The relative positions of the receivers $R_1$ and $R_2$ are precisely known, and the transmitter location is known when measurements are made to determine synchronizing error and/or to determine ionospheric conditions.

For purposes of illustration, the station $R_2$ is defined as the control or local station and the station $R_1$ is defined as the remote station. The angle $\theta$ to the transmitter is measured from the midpoint of the baseline between $R_1$ and $R_2$. The distance $\overline{D}$ from the transmitter to the midpoint of the baseline is substantially equal to:

$$\overline{D} = \frac{D_1 + D_2}{2} \quad (4)$$

if the baseline distance $\Delta R$ is in the order of a few wavelengths and if the distances $D_1$ and $D_2$ to the transmitter are quite large relative to $\Delta R$. It has been determined that distances must be determined from a spheroidal earth model.

From FIG. 1, $\cos\theta(\overline{D})$ is equal to:

$$\cos\theta(\overline{D}) = \frac{D_2 - D_1}{\Delta R} = \frac{\Delta D}{\Delta R} \quad (5)$$

$$\Delta D = \Delta R \cos\theta(\overline{D})$$

Since incremental phase velocity $V_1(f,\overline{D})$ is equal to:

$$V_i(f,\overline{D}) = \frac{\Delta D}{\Delta t}(f,\overline{D}) \tag{6}$$

$$V_i(f,\overline{D}) = \frac{\Delta R \cos\theta(\overline{D})}{\Delta t}, \text{ and} \tag{7}$$

$$\Delta t = \frac{\Delta R \cos\theta(\overline{D})}{V_i(f,\overline{D})} \tag{8}$$

The received signals at $R_1$ and $R_2$ are defined as $E_1$ and $E_2$, respectively, where $$E_1 = A_1 \sin(2\pi f t), \text{ and} \tag{9}$$

$$E_2 = A_2 \sin 2\pi f\left(t - \frac{\Delta R \cos\theta(\overline{D})}{V_i(f,\overline{D})}\right) \tag{10}$$

If $2\pi f t = \phi_1$, and $$2\pi f\left(t - \frac{\Delta R \cos\theta(\overline{D})}{V_i(f,\overline{D})}\right) = \phi_2, \text{ then} \tag{11}$$

$$(\phi_1 - \phi_2) = 2\pi f \frac{\Delta R}{V_i(f,\overline{D})} \cos\theta(\overline{D}) \tag{12}$$

where $(\phi_1 - \phi_2)$ is defined as the angular phase difference of a signal as it arrives at each of the two stations $R_1$ and $R_2$. In general, the angular phase difference is greater than $2\pi$ radians.

The total effective distance in wavelengths, i.e., cycles between $R_1$ and $R_2$ at an incremental phase equal to the velocity of light, is given by $$\frac{(\phi_1 - \phi_2)}{2\pi} = \frac{\Delta R}{C} f \cos\theta = \Delta\lambda_c (n + \Delta\lambda_c) \tag{13}$$

where $n = 0, 1, 2, \ldots$ and where $\Delta\lambda_c$ is a fractional wavelength.

The measured effective distance in wavelengths, which in general will be different from that given above, is defined by the following equation:

$$n + \Delta\lambda_m = \frac{\Delta R}{V_i(\overline{D})} f \cos\theta \tag{14}$$

If the ratio $V_i/C$ is approximately equal to one, n in equation (13) is equal to n in equation (14), and the required ratio for $V/C$ is defined as follows:

$$\frac{V}{C} = \left[\frac{n + \Delta\lambda_c}{n + \Delta\lambda_m}\right] \tag{15}$$

The value for $\Delta\lambda_m$ is obtained directly from an actual measurement as a fractional cycle which is also a fractional wavelength. It is apparent from equation (15) that for VLF transmitters whose locations are known, the measurement of $\Delta\lambda_m$ for each frequency provides immediate knowledge of the ionospheric condition over very great areas. In other words, the ionospheric model which is used to calculate $V_i/C$ for all frequencies can be up-dated to match the measured values.

From equation (14), $$\cos\theta = \frac{(n + \Delta\lambda_m) V_i(\overline{D})}{\Delta R f} \tag{16}$$

When several pairs of time- and phase-synchronized receivers exist, transmissions from an unknown location would provide a number of values for $\Delta\lambda_m$. For each measured value, $\cos\theta$ is written as $$\left.\begin{array}{rcl}\cos\theta_1 &=& \dfrac{(n_1 + \Delta\lambda_{m1})V_i(\overline{D})}{\Delta R f} \\[6pt] \cos\theta_2 &=& \dfrac{(n_2 + \Delta\lambda_{m2})V_i(\overline{D})}{\Delta R f} \\ & \vdots & \\ \cos\theta_k &=& \dfrac{(n_k + \Delta\lambda_{mk})V_i(\overline{D})}{\Delta R F}\end{array}\right\} \tag{17}$$

where $\Delta R$ is assumed to be the same for all station pairs.

Because $V_i(\overline{D})$ is approximately equal to the velocity of light C, this value can be used in equation (17) to obtain a coarse location of the unknown transmitter.

Once the coarse location is known, calculated values of $V_i(\overline{D})$ which are consistent with the current state of the ionosphere may be used in equation (17) in place of C. These refined values of incremental phase velocity reduce the coarse estimate to a single precise location consistent with all the measured and calculated values.

Further internal consistency can be obtained by comparing relative amplitudes at each of the receiver locations. If time is not limited, a third parameter is contained in average phase velocity change, $[\overline{V}(D,t_1) - \overline{V}(D,t_2)]$, which can also be calculated and compared to measurements of relative phase.

If in FIG. 1, a second transmitter $T_2$ is located to the west of the receivers $R_1$ and $R_2$, the fractional cycle phase difference, $(\phi_1 - \phi_2)$ of equation (12) assumes a minus or negative value. Since the data processing apparatus of FIG. 3 can only recognize a 0 to 1.0 value for the fractional cycle measurement, the measured value must be normalized. For instance, if a $-0.1$ fractional cycle difference exists, the analog measurement would be 0.9. This number (0.9) must be normalized by subtracting it from 1.0 before the resultant value may be used in equation (17).

Figure 2:
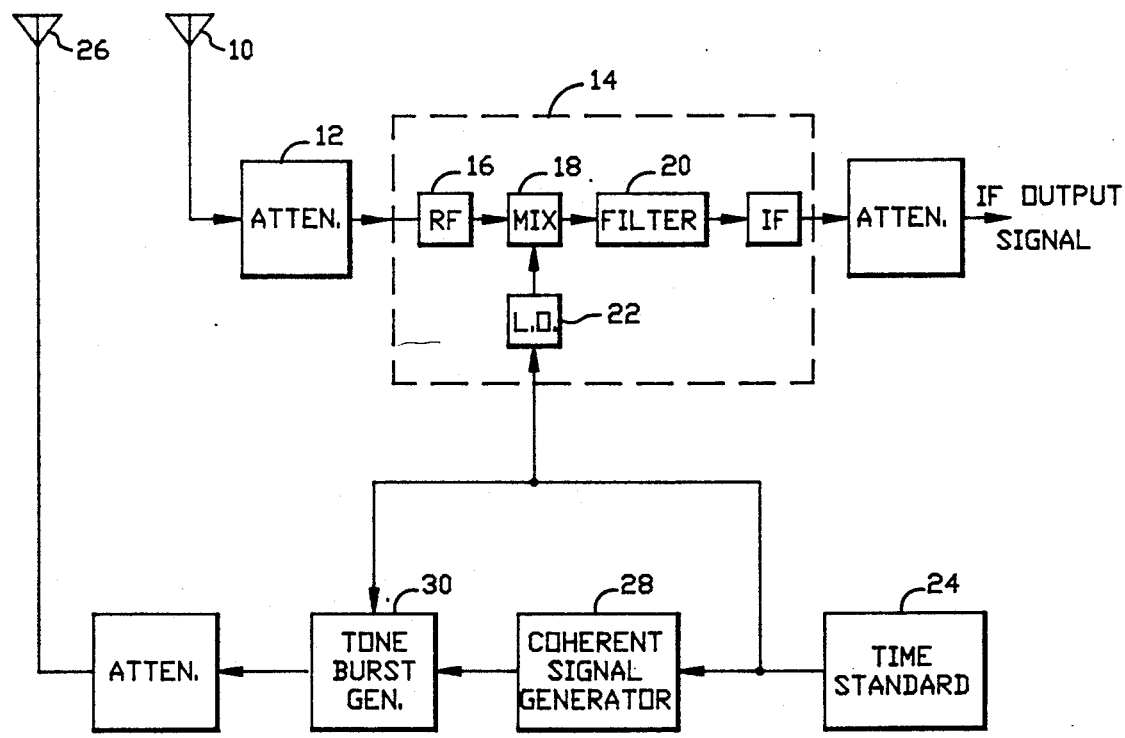
FIG. 2 is a schematic block diagram of calibration circuitry used in the inventive system; and, FIG. 3 is a schematic block diagram of receiver and data processing apparatus for measuring signal phase differentials in accordance with the present inventive concept.
Figure 3:
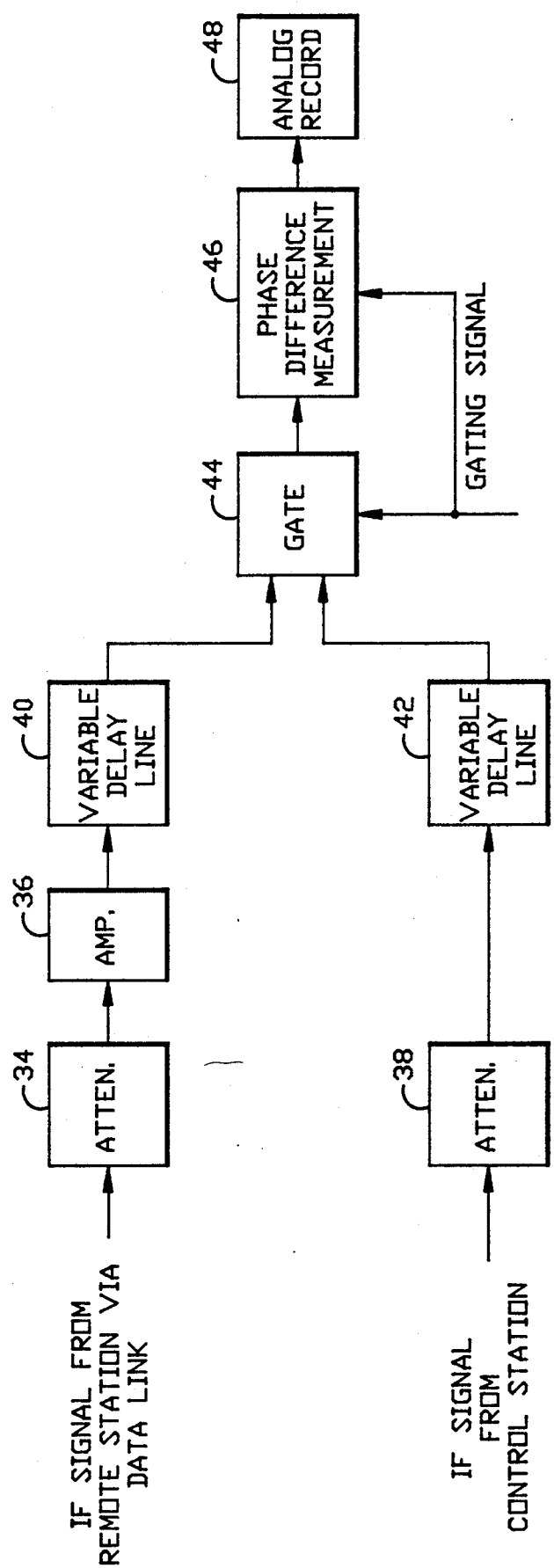

The above theory can be utilized with the circuitry of FIG. 2 and FIG. 3 to achieve highly accurate VLF fractional cycle measurements between separated time- and phase-synchronized receivers, arranged as shown in FIG. 1, for example.

FIG. 2 illustrates calibration circuitry which would be provided at each receiver station to synchronize the phase at the receiver stations $R_1$ and $R_2$. It should be appreciated that an identical unit would be provided at each station. The calibration circuit comprises a first vertical whip antenna 10 whose output is coupled through an attenuator 12 to the receiver 14.

The receiver 14 comprises a VLF receiver and includes the RF filter 16, the mixer 18, the IF filter 20, and the local oscillator 22. The local oscillator (synthesizer) 22 is driven by a phase stable signal from the time standard 24.

In the case of the remote station $R_1$, the receiver 14 produces an IF signal output which is sent to the data processing circuitry of FIG. 3 via a suitable data link such as, for example, a telephone line, for processing to be described hereinafter.

The calibration is accomplished by means of the short, vertical whip antenna 26 which transmits a calibration signal which is derived from the coherent signal generator 28 and tone burst generator 30.

The receiver 14, the generator 28, and the tone burst generator 30 are time-synchronized by the output of the time standard 24 which can comprise a Cesium standard. It should be noted and appreciated that mutually synchronized time standards are provided at each station to synchronize network reception.

The antenna 26 produces a near field whose magnitude is made large enough to be received by the receiving antenna 10, and the pulsed calibration signals generated at the two receiving sites, $R_1$ and $R_2$, are synchronized in time and phase by the circuit of FIG. 3. This procedure removes any time and phase differences introduced by differences in the two receiving systems and the data link which connects the remote station to the control (local) station.

The IF output signal from the receiver 14 at the remote station is received at the control station via the data link. The link-signal and the locally generated signal are then processed by the circuit of FIG. 3 as follows. First, the IF signal from the link is attenuated and amplified by 34 and 36, and the IF signal generated at the control station is adjusted to the same level by the attenuator 38. It should be noted that the two receivers (remote and control) are always operated at a fixed amplitude level.

When the two receiver systems are synchronized in time and phase and when the two sets of transmitting and receiving antennas are not very far apart (no data link being used), calibration signals at a common frequency can be generated and received by each of the two systems without any detectable interference from each other since the radiated near field attenuates rapidly. The IF output signal from the link and from the control station are delayed by the two variable delay lines 40 and 42, respectively. The delayed signals are then passed sequentially through the gate 44 at, for example, three-second segments.

The phase of each IF output signal is next obtained by the device 46, relative to a common reference signal and after considerable integration time. The phase difference between the two calibration signals is also obtained thereby and appears on the recorder 48 in analog form as a fractional cycle difference.

In calibrating the system for VLF differential phase measurement, the two delay lines are adjusted to produce a zero phase difference indication for all available VLF signals while the two receiving antennas are at essentially zero separation difference.

If one receiving system is moved relative to the control station, it will be necessary to reduce the delay on the variable delay line in series with a remote signal to compensate for the added link delay. This delay is readily achieved by adjusting the appropriate delay line 40 until the calibration signal fractional cycle phase difference again is substantially equal to zero. At this time, a zero fractional cycle phase difference measurement will be obtained if a VLF signal is received at both sites from a transmitter which is located at a point equidistant from the two receiving antennas (which are now separated relative to each other by the baseline distance $\Delta R$).

With respect to timing error considerations, a portable clock can be used to synchronize the remote station time and phase to that of the control station whereby the coherent calibration signal can be used to accurately compensate for the data link delay. Thus the differential phase measurements obtained immediately after the two systems have been synchronized with the portable clock will be quite accurate. At this time, transmissions from known VLF transmitters can be used to measure a series of fractional cycle differences $\Delta\lambda_{m1}$, $\Delta\lambda_{m2}$, $\Delta\lambda_{m3}$, ... $\Delta\lambda_{mk}$. Subsequent measurements which contain synchronizing error are designated as $\Delta\psi_{m1}$, $\Delta\psi_{m2}$, $\Delta\psi_{m3}$, ... $\Delta\psi_{mk}$. If these values are used in the expression $$E_s = \frac{\Delta\lambda_{m1} - \Delta\psi_{m1}}{f_1} = \frac{\Delta\lambda_{m2} - \Delta\psi_{m2}}{f_2} = \frac{\Delta\lambda_{m3} - \Delta\psi_{m3}}{f_3} \cdots \frac{\Delta\lambda_{mk} - \Delta\psi_{mk}}{f_k} \qquad (18)$$

the synchronizing error $E_s$ can be determined. The frequencies $f_1, f_2, \ldots f_k$ are the appropriate local oscillator frequencies used to receive the signals from the known VLF transmitters.

It has been demonstrated that nanosecond synchronizing errors can be identified and removed from the data by using this method.

In the data processing system shown in FIG. 3, the phase measurement circuit 46 can comprise a TRACOR 599R Omega receiver. The receiver can measure the phase difference between the locally derived IF signal and from the IF signal from a remote station. Details of the above receiver are given in the *Omega VLF Receiver Operation and Service Manual* (Tracor, Inc. in February 1968).

The gating circuit shown in FIG. 3 functions to alternately gate the local IF signal and remote IF signal to the input of the 599R comparator in coincidence with control signals generated in the 599R receiver.

Obviously many modifications and variations of the present invention are possible in the light of the above teachings. It is therefore to be understood that within the scope of the appended claims the invention may be practiced otherwise than as specifically described.

What is claimed is:

1. Apparatus for locating unknown transmitters over great distances at a frequency f below HF comprising:
   a plurality of separated time synchronized receiver sites,
   each of said sites comprising a local station and a remote station separated a known baseline distance $\Delta R$ with respect to each other;
   receiver means at said remote station and said local station for producing a remote IF output and a local IF output, respectively, in response to received signals from an unknown transmitter having a bearing $\theta$ and a range $\overline{D}$ measured from the center of said baseline distance;
   data link means for coupling said remote output to said local station;
   phase comparator means at said local station for measuring the phase difference between said remote output and said local output, wherein said phase difference is related to said bearing; and,
   calibration means at each of said stations for phase synchronizing said stations with respect to each other whereby signals received from a transmitter located at a point equidistant from said stations produces a zero phase difference measurement at the output of said phase comparator.

2. A method for locating unknown transmitters over great distances at a frequency f below HF comprising the steps of:

receiving signals transmitted by an unknown transmitter at different separated and time-synchronized pairs of local and remote receiver stations;

phase synchronizing each of said pairs to produce zero phase differential when signals are received from a transmitter located equidistant from said local and remote stations; and, measuring the phase difference between signals received at said stations whereby said phase difference is directly proportional to the cosine of the bearing from the midpoint of a line between said stations to said unknown transmitter.

* * * * *